(12) United States Patent
Kubo et al.

(10) Patent No.: US 8,550,956 B2
(45) Date of Patent: *Oct. 8, 2013

(54) PLANETARY GEAR UNIT

(71) Applicants: Ryohei Kubo, Anjo (JP); Atsushi Mori, Anjyo (JP); Kouichi Kato, Toyota (JP)

(72) Inventors: Ryohei Kubo, Anjo (JP); Atsushi Mori, Anjyo (JP); Kouichi Kato, Toyota (JP)

(73) Assignees: Aisin AW Co., Ltd., Anjo (JP); Toyota Jidosha Kabushiki Kaisha, Toyota (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/622,184

(22) Filed: Sep. 18, 2012

(65) Prior Publication Data

US 2013/0072345 A1    Mar. 21, 2013

(30) Foreign Application Priority Data

Sep. 19, 2011    (JP) .................................. 2011-203966

(51) Int. Cl.
*F16H 57/08* (2006.01)

(52) U.S. Cl.
USPC ........................................ 475/331; 74/606 R

(58) Field of Classification Search
USPC .......................... 475/331, 334, 346; 74/606 R
See application file for complete search history.

(56) References Cited

U.S. PATENT DOCUMENTS

| | | | |
|---|---|---|---|
| 5,099,704 A * | 3/1992 | Williams et al. | 74/15.88 |
| 5,156,579 A | 10/1992 | Wakuta et al. | |
| 5,813,938 A * | 9/1998 | Forster | 475/331 |
| 2007/0265133 A1 * | 11/2007 | Smook | 475/317 |
| 2013/0008274 A1 * | 1/2013 | Mori et al. | 74/421 A |

FOREIGN PATENT DOCUMENTS

| | | |
|---|---|---|
| JP | A-04-185262 | 7/1992 |
| JP | A-07-298547 | 11/1995 |
| JP | A-08-061438 | 3/1996 |
| JP | A-2000-052788 | 2/2000 |
| JP | A-2000-120812 | 4/2000 |
| JP | A-2003-191761 | 7/2003 |
| JP | A-2004-116736 | 4/2004 |
| JP | A-2005-132365 | 5/2005 |
| JP | A-2008-126710 | 6/2008 |
| JP | A-2009-079625 | 4/2009 |
| JP | A-2009-168142 | 7/2009 |
| JP | A-2009-209965 | 9/2009 |
| JP | A-2009-291053 | 10/2009 |

* cited by examiner

*Primary Examiner* — Justin Holmes
(74) *Attorney, Agent, or Firm* — Oliff & Berridge, PLC

(57) ABSTRACT

A planetary gear unit inside a case includes coaxial sun and ring gears, a planetary pinion gear that meshes with the sun and ring gears, and a carrier that holds the planetary pinion gear, the ring gear being fixed with respect to the case, and a flange disposed inward of the ring gear. The ring gear is fixed to a case wall, via the flange, the wall extending radially inward, and the flange being prevented from rotating with respect to the wall by a rotation prevention mechanism. The rotation prevention mechanism includes a plurality of case holes on the same circle in the wall, flange holes in the flange at positions corresponding to the case holes, and rotation prevention members fitted into the case and flange holes to prevent rotation of the flange with respect to the wall with the flange relatively movable axially with respect to the wall.

38 Claims, 11 Drawing Sheets

F I G . 2
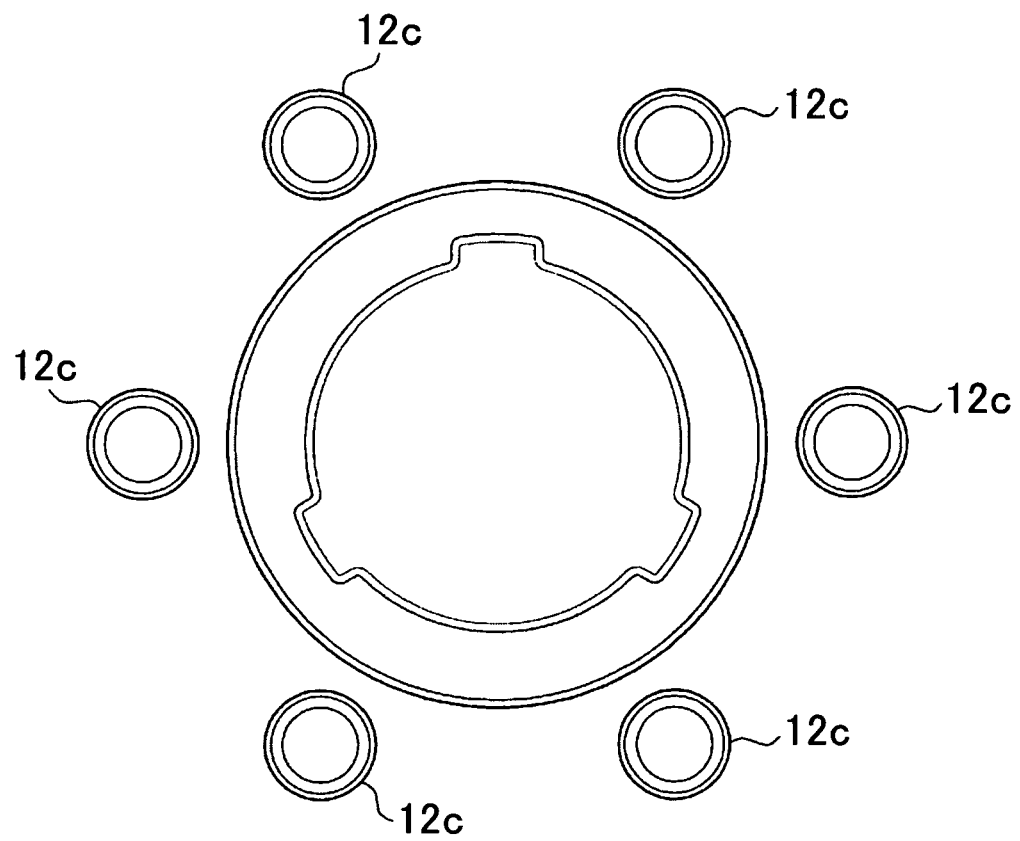

PLANETARY GEAR UNIT

INCORPORATION BY REFERENCE

The disclosure of Japanese Patent Application No. 2011-203966 filed on Sep. 19, 2011 including the specification, drawings and abstract is incorporated herein by reference in its entirety.

BACKGROUND OF THE INVENTION

The present invention relates to a planetary gear unit used in an automatic transmission etc., and more particularly to a planetary gear unit that reduces gear noise.

DESCRIPTION OF THE RELATED ART

Some vehicles (such as hybrid vehicles and electric vehicles) including a motor generator as a drive source include a speed reduction mechanism (planetary gear unit) that transfers rotation of the motor generator to an output shaft with the speed of the rotation reduced. The speed reduction mechanism includes a sun gear, a carrier, and a ring gear. Of these constituent elements, one of the carrier and the ring gear needs to be fixed. It is decided in accordance with the required specifications or the like which of the carrier and the ring gear is fixed.

In the case where the ring gear is fixed, the ring gear may be fixed to a case at the outer periphery of the ring gear, for example. In this case, pinion gears revolve while rotating about their respective axes, and thus it is not necessary to form an oil passage to supply lubricating oil to the pinion gears. In the case where the ring gear is fixed, however, vibration due to meshing between the gears and vibration caused by deformation of the ring gear itself due to a compelling force (a force applied from the pinion gears to the ring gear during operation of the speed reduction mechanism) may be directly transferred to the outer peripheral portion of the case to increase gear noise emitted from the case.

Thus, in a device according to the related art, a ring gear is fixed to a case by meshing the ring gear with a ring gear flange via splines provided on the inner periphery of the ring gear and fastening the ring gear flange to the case using bolts (Japanese Patent Application Publication No. 2009-079625).

SUMMARY OF THE INVENTION

With the ring gear flange fastened to the case using the bolts, however, torque is received by a seat surface friction force generated by the axial forces of the bolts, and a large number of bolts are required to support large torque. Consequently, a space for a large number of threaded bores for receiving the bolts is required. In addition, a space is required in the axial direction with respect to the head portions of the bolts, thereby increasing the axial length of the planetary gear. Thus, the size of the speed reduction mechanism is increased.

The present invention has been made in view of addressing the foregoing issue, and therefore has an object to provide a planetary gear unit that can reliably reduce gear noise emitted from a case while achieving a size reduction.

In order to address the foregoing issue, an aspect of the present invention provides a planetary gear unit housed inside a case and comprising a sun gear, a ring gear disposed coaxially with the sun gear, a planetary pinion gear that meshes with the sun gear and the ring gear, and a planetary carrier that holds the planetary pinion gear, the ring gear being fixed with respect to the case, characterized in that: the planetary gear unit includes a ring gear flange disposed on an inner peripheral side with respect to the ring gear; the ring gear is fixed to a case wall via the ring gear flange, the case wall being formed in the case to extend radially inward, and the ring gear flange being prevented from rotating with respect to the case wall by a rotation prevention mechanism; and the rotation prevention mechanism includes a plurality of case holes formed on the same circle in the case wall, flange holes provided in the ring gear flange at positions corresponding to the case holes, and rotation prevention members fitted into the case holes and the flange holes to prevent rotation of the ring gear flange with respect to the case wall with the ring gear flange relatively movable in an axial direction with respect to the case wall.

In the planetary gear unit, the ring gear is fixed. More specifically, the ring gear is fixed to the case wall via the ring gear flange which is fixed (prevented from rotating) with respect to the case wall by the rotation prevention mechanism. That is, the ring gear is fixed with respect to the case by fixing (preventing rotation of) the ring gear flange to the case wall which is a part of the case, rather than by fixing the ring gear to the case at the outer periphery of the ring gear. This saves physical contact between the outer periphery of the ring gear and the case, thereby making it less likely that vibration due meshing between the gears and vibration caused by deformation of the ring gear itself due to a compelling force is transferred to the outer periphery of the case. In addition, vibration of the ring gear due to other factors is transferred to the outer periphery of the case via the case wall. As a result, gear noise emitted from the case can be reliably reduced.

In addition, the rotation prevention mechanism includes the case holes formed in the case wall, the flange holes formed in the ring gear flange, and the rotation prevention members fitted into the case holes and the flange holes to prevent rotation of the ring gear flange with respect to the case wall with the ring gear flange relatively movable in the axial direction with respect to the case wall. The rotation prevention members are thus fitted into the case holes and the flange holes which can be formed by simply drilling holes. This facilitates securing the positional accuracy of the case holes and the flange holes and the machining accuracy of the rotation prevention members, thereby applying an equal shearing force to the plurality of rotation prevention members. Thus, the number of the rotation prevention members can be reduced and the size of the rotation prevention members can be reduced even in the case where large torque is applied, thereby achieving a size reduction of the rotation prevention mechanism. Hence, it is possible to reliably reduce gear noise emitted from the case while achieving a size reduction of the planetary gear unit.

In the aspect described above, the rotation prevention members may be press-fitted into the case holes, and loosely fitted into the flange holes.

According to the aspect, with the rotation prevention members press-fitted into the case holes, rattle between the case holes and the rotation prevention members can be eliminated, thereby suppressing input of an offset load to the case holes. This improves the durability of the case.

In the aspect described above, the case holes may be holes that penetrate through the case wall; and the rotation prevention members may be longer than the case holes in the axial direction, and end portions of the rotation prevention members on a side opposite to a side on which the ring gear flange may be disposed with respect to the case wall project from the case holes.

According to the aspect, the case holes are holes that penetrate through the case wall, and the rotation prevention members are longer than the case holes in the axial direction, and the end portions of the rotation prevention members on the side opposite to the side on which the ring gear flange is disposed with respect to the case wall project from the case wall. Therefore, the fitting between the rotation prevention members and the case holes is not released even if a load is received at the end portions of the rotation prevention members on the side on which the ring gear flange is disposed with respect to the case wall.

In the aspect described above, the rotation prevention members may include a flange portion provided at the end portions of the rotation prevention members on the side opposite to the side on which the ring gear flange is disposed with respect to the case wall, the flange portion being larger in diameter than the case holes.

According to the aspect, the rotation prevention members include the flange portion provided at the end portions of the rotation prevention members on the side opposite to the side on which the ring gear flange is disposed with respect to the case wall, the flange portion being larger in diameter than the case holes. Therefore, the fitting between the rotation prevention members and the case holes is not released more reliably even if a load is received at the end portions of the rotation prevention members on the side on which the ring gear flange is disposed with respect to the case wall.

In the aspect described above, the ring gear flange may be positioned with respect to the case wall by a centering mechanism; the centering mechanism may use fitting between a boss portion of the ring gear flange and the case wall; and the rotation prevention mechanism may be disposed on an outer peripheral side with respect to the centering mechanism.

According to the aspect, the ring gear flange is positioned with respect to the case wall by the centering mechanism, the centering mechanism uses fitting between the boss portion of the ring gear flange and the case wall, and the rotation prevention mechanism is disposed on the outer peripheral side with respect to the centering mechanism. The centering mechanism allows the ring gear to be centered. With the ring gear fixed via the ring gear flange, further, the ring gear can also be centered through meshing between the ring gear and the pinion gear. The ring gear can thus be centered accurately.

In addition, the rotation prevention mechanism is disposed on the outer peripheral side with respect to the centering mechanism, thereby allowing the rotation prevention mechanism to be disposed relatively on the outer peripheral side in the ring gear flange. Therefore, the load acting on the rotation prevention mechanism can be reduced, thereby allowing the ring gear to be firmly fixed in position. The firm fixation of the ring gear and the accurate centering of the ring gear described above can improve tooth contact between the ring gear and the pinion gear. This makes it possible to reduce gear noise without reducing the durability of the gears. Thus, gear noise emitted from the case can be further reduced.

Further, with the rotation prevention mechanism disposed on the outer peripheral side with respect to the centering mechanism, the centering mechanism with reduced rattle is disposed on the inner peripheral side, and the rotation prevention mechanism which may cause greater rattle than that caused by the centering mechanism is disposed on the outer peripheral side. This prevents galling due to a difference in thermal expansion coefficient between the case wall and the ring gear flange.

In the aspect described above, the boss portion may be longer than portions of the rotation prevention members that project toward the side on which the ring gear flange is disposed with respect to the case wall in the axial direction.

According to the aspect, the boss portion is longer than the portions of the rotation prevention members that project toward the side on which the ring gear flange is disposed with respect to the case wall in the axial direction. This allows the rotation prevention members press-fitted into the case wall to be inserted into the flange holes of the ring gear flange with the boss portion of the ring gear flange assembled to the case wall when assembling the ring gear flange to the case wall. This improves the ease of assembly of the ring gear flange to the case wall.

In the aspect described above, an amount of relative movement of the ring gear flange with respect to the case wall in the axial direction may be restricted by the case via a bearing and the sun gear.

According to the aspect, the amount of relative movement of the ring gear flange with respect to the case wall in the axial direction is restricted by the case via the sun gear and the bearing. Consequently, although a pressure due to a fastening force is applied to the case at all times in the case where the amount of relative movement of the ring gear flange with respect to the case wall in the axial direction is restricted using fastening means such as bolts, for example, such a pressure is not applied in the aspect. Thus, the amount of relative movement of the ring gear flange with respect to the case wall in the axial direction can be restricted while improving the strength of the case.

In the aspect described above, the rotation prevention members may be bar-like members.

According to the aspect, the rotation prevention members are bar-like members. This facilitates more reliably securing the machining accuracy of the rotation prevention members, and more reliably applying an equal shearing force to the plurality of rotation prevention members. Thus, it is possible to reduce gear noise emitted from the case while more reliably achieving a size reduction of the planetary gear unit.

In the aspect described above, the case holes and the flange holes may be cylindrical holes; and the bar-like members may be cylindrical members.

According to the aspect, the case holes and the flange holes are cylindrical holes, and the bar-like members are cylindrical members. This facilitates more reliably securing the positional accuracy of the case holes and the flange holes and the machining accuracy of the bar-like members, and further reliably applying an equal shearing force to the plurality of bar-like members (rotation prevention members). Thus, it is possible to further reduce gear noise emitted from the case while achieving a further size reduction of the planetary gear unit.

According to the planetary gear unit of the present invention, it is possible to reliably reduce gear noise emitted from a case while achieving a size reduction.

BRIEF DESCRIPTION OF THE DRAWINGS

FIG. 2 shows the arrangement of press-fitting holes formed in an intermediate wall;

DETAILED DESCRIPTION OF THE EMBODIMENTS

Figure 1:
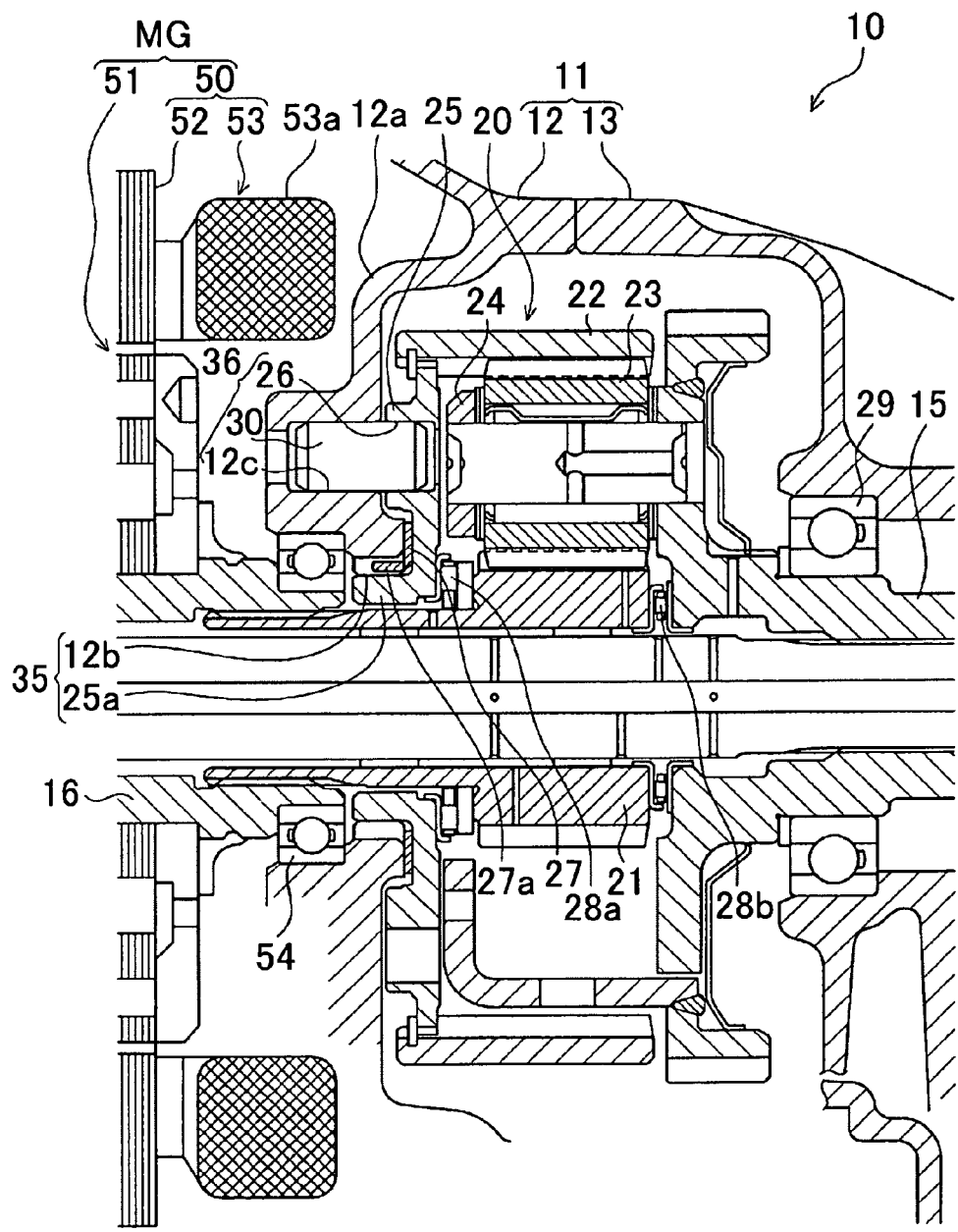
FIG. 1 is a sectional view showing a schematic configuration of a drive device according to an embodiment, and showing the area around a speed reduction mechanism.

A vehicle drive device having a planetary gear unit according to a preferred embodiment of the present invention will be described in detail below with reference to the drawings. The embodiment is a longitudinally-mounted drive device to be mounted on a front-engine rear-drive (FR) hybrid vehicle. The drive device according to the embodiment will be described with reference to FIG. 1. FIG. 1 is a sectional view showing a schematic configuration of the drive device according to the embodiment, and showing the area around a speed reduction mechanism (planetary gear unit).

As shown in FIG. 1, a drive device 10 according to the embodiment includes a motor generator MG, a speed reduction mechanism 20 (planetary gear unit) connected to the motor generator MG, and an output shaft 15 connected to the speed reduction mechanism 20. These components are housed inside a transmission case 11 formed from a main housing 12 and an extension housing 13. The main housing 12 and the extension housing 13 are each formed by shaping a metal material such as aluminum, and positioned via knock pins provided in mating surfaces to be joined to each other. In the drive device 10, rotation of the motor generator MG is reduced in speed by the speed reduction mechanism 20 to be output from the output shaft 15.

The motor generator MG have both a function (power running function) as an electric motor of being driven by supply of electric power and a function (regeneration function) as an electric generator of converting mechanical energy into electrical energy. The motor generator MG mainly operates as an electric motor. An alternating-current synchronous motor generator, for example, may be used as the motor generator MG. An electricity accumulation device such as a battery or a capacitor or a fuel cell known in the art, for example, may be used as an electric power supply device.

The motor generator MG includes a stator 50 fixed to the main housing 12, and a rotor 51 that is freely rotatable. The stator 50 includes a stator core 52 and a coil 53 wound around the stator core 52. The rotor 51 and the stator core 52 are each formed by stacking a plurality of magnetic steel sheets having a predetermined thickness in the thickness direction (left-right direction in FIG. 1). A rotor shaft 16 is disposed at the center of the rotor 51. The rotor 51 and the rotor shaft 16 are coupled to each other. This allows the rotor 51 and the rotor shaft 16 to rotate together with each other. The rotor shaft 16 is rotatably supported by a pair of bearings. Of the pair of bearings, a bearing 54 disposed on the speed reduction mechanism 20 side is fixed to an intermediate wall 12a forming a part of the main housing 12 and formed in the main housing 12 to extend radially inward. The intermediate wall 12a separates the motor generator MG and the speed reduction mechanism 20 from each other.

The speed reduction mechanism 20 is disposed coaxially with the motor generator MG with the intermediate wall 12a interposed therebetween. This allows the intermediate wall 12a to separate the motor generator MG and the speed reduction mechanism 20 from each other in the transmission case 11. The speed reduction mechanism 20 is housed inside the transmission case 11, and is a so-called single-pinion planetary gear unit. That is, the speed reduction mechanism 20 includes a sun gear 21, a ring gear 22 disposed coaxially with the sun gear 21, and a planetary carrier 24 that holds planetary pinion gears 23 that mesh with the sun gear 21 and the ring gear 22. The planetary carrier 24 is joined to the output shaft 15 by welding. The output shaft 15 is rotatably supported by a bearing 29. The bearing 29 is fixed to the extension housing 13 so as to restrict movement of the output shaft 15 in the thrust direction.

In the speed reduction mechanism 20, the ring gear 22 is fixed to the transmission case 11 (main housing 12). The rotor shaft 16 and the sun gear 21 are spline-engaged with each other. The planetary carrier 24 and the output shaft 15 are joined to each other by welding. This allows rotation of the rotor shaft 16 to be transferred to the output shaft 15 with the speed of the rotation reduced by the planetary gear unit in the speed reduction mechanism 20.

Figure 3:
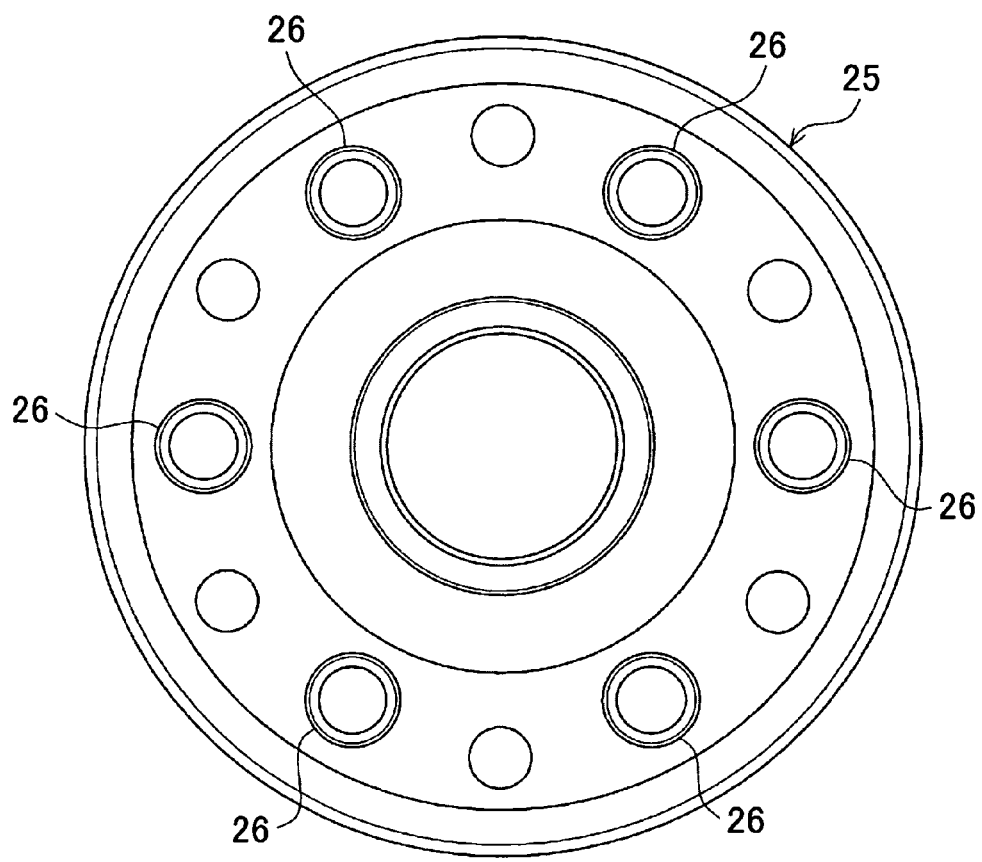
FIG. 3 is a plan view of a ring gear flange as seen from a motor generator side.

The fixing structure for the ring gear 22 will be described with reference to FIGS. 2 and 3 in addition to FIG. 1. FIG. 2 shows the arrangement of press-fitting holes formed in the intermediate wall. FIG. 3 is a plan view of a ring gear flange as seen from the motor generator side.

As shown in FIG. 1, the ring gear 22 is fixed to the intermediate wall 12a via a ring gear flange 25 disposed on the inner peripheral side with respect to the ring gear 22. Specifically, the outer periphery of a boss portion 25a of the ring gear flange 25 and a fitting hole 12b formed in the intermediate wall 12a are fitted (spigot-jointed in the embodiment, but the present invention is not limited thereto) to each other. In addition, a cylindrical pin 30 (an example of the "rotation prevention member" or "bar-like member" according to the present invention) provided to the intermediate wall 12a is inserted (fitted with play) into a pin insertion hole 26 (an example of the "flange hole" according to the present invention) formed in the ring gear flange 25. This prevents rotation of the ring gear flange 25 with respect to the intermediate wall 12a. This also fixes the ring gear 22 to the intermediate wall 12a. Further more specifically, the pin 30 fixes (prevents rotation of) the ring gear flange 25 and the ring gear 22 with respect to the intermediate wall 12a with the ring gear flange 25 and the ring gear 22 relatively movable in the axial direction with respect to the intermediate wall 12a. This saves physical contact of the outer periphery of the ring gear 22 with the transmission case 11, thereby making it less likely that vibration due meshing between the gears in the speed reduction mechanism 20 and vibration caused by deformation of the ring gear 22 itself due to a compelling force is transferred to the outside of the transmission case 11. In addition, vibration of the ring gear 22 due to other factors is transferred to the outside of the transmission case 11 via the intermediate wall 12a. As a result, it is possible to reliably reduce gear noise emitted from the transmission case 11 in the drive device 10.

The amount for which the ring gear flange 25 is relatively movable in the axial direction with respect to the intermediate wall 12a is restricted by the extension housing 13 of the transmission case 11 to such an amount that does not release the fitting between the pin 30 and the pin insertion hole 26. Specifically, the amount for which the ring gear flange 25 is relatively movable in the axial direction with respect to the intermediate wall 12a is restricted by the extension housing 13 via a bearing 28a, the sun gear 21, a bearing 28b, the output shaft 15, and the bearing 29. A washer is provided on both sides of the bearing 28a, on both sides of the bearing 28b, and between the output shaft 15 and the bearing 29. Consequently, although a pressure due to a fastening force is applied to the transmission case 11 at all times in the case where the amount for which the ring gear flange 25 is relatively movable in the axial direction with respect to the intermediate wall 12a is restricted using fastening means such as bolts, for example, such a pressure is not applied in the embodiment described above. Thus, the amount of relative movement of the ring gear flange 25 with respect to the intermediate wall 12a in the axial direction can be restricted while improving the strength of the transmission case 11.

The ring gear flange 25 and the intermediate wall 12a contact each other via a washer 27. A plurality of hook portions 27a to be inserted into the intermediate wall 12a are formed on the washer 27. In the embodiment, three hook portions 27a are formed on the washer 27. The hook portions 27a fix (prevent rotation of) the washer 27 to the intermediate wall 12a. The washer 27 prevents wear of the intermediate wall 12a.

The ring gear 22 can be centered by a centering mechanism 35 that uses the spigot joint between the boss portion 25a of the ring gear flange 25 and the fitting hole 12b of the intermediate wall 12a. Thus, in the embodiment, the centering mechanism 35 for the ring gear 22 is formed from the boss portion 25a of the ring gear flange 25 and the fitting hole 12b of the intermediate wall 12a. With the outer periphery of the ring gear 22 not fixed, in addition, the ring gear 22 can be centered through meshing between the ring gear 22 and the planetary pinion gears 23. The ring gear 22 can thus be centered accurately by the fixing structure for the ring gear according to the embodiment.

A plurality of pins 30 and pin insertion holes 26 that fix (prevent rotation of) the ring gear 22 to the intermediate wall 12a are formed on the same circle at regular intervals. The pins 30 are press-fitted into a plurality of cylindrical press-fitting holes 12c (an example of the "case hole" according to the present invention) formed in the intermediate wall 12a on the same circle at regular intervals as shown in FIG. 2. In the embodiment, six press-fitting holes 12c are formed in the intermediate wall 12a, and the pins 30 are press-fitted (fitted) into the respective press-fitting holes 12c. In the ring gear flange 25, on the other hand, the cylindrical pin insertion holes 26 for insertion of the pins 30 press-fitted into the intermediate wall 12a are formed at positions corresponding in phase to the press-fitting holes 12c in the circumferential direction of the ring gear flange 25 as shown in FIG. 3. The diameter of the pin insertion holes 26 is made slightly larger than the diameter of the pins 30 to improve the ease of attachment of the speed reduction mechanism 20 to the intermediate wall 12a. Insertion of the pins 30 into the pin insertion holes 26 fixes (prevents rotation of) the ring gear 22 to the intermediate wall 12a. That is, in the embodiment, a rotation prevention mechanism 36 is formed with a significantly simple structure from the pins 30 press-fitted into the press-fitting holes 12c of the intermediate wall 12a and the pin insertion holes 26 of the ring gear flange 25.

As shown in FIG. 1, the rotation prevention mechanism 36 formed from the pins 30, the press-fitting holes 12c, and the pin insertion holes 26 is disposed on the outer peripheral side with respect to the centering mechanism 35 formed from the boss portion 25a and the fitting hole 12b. This allows the rotation prevention mechanism 36 to be disposed relatively on the outer peripheral side in the ring gear flange 25. Therefore, the load acting on the pins 30 can be reduced, allowing the ring gear 22 to be firmly fixed in position even in the case where relatively large torque is input to the speed reduction mechanism 20. As a result, tooth contact between the ring gear 22 and the planetary pinion gears 23 can be improved in combination with the accurate centering of the ring gear 22 achieved by the centering mechanism 35. Thus, the durability of the gears in the speed reduction mechanism 20 is not reduced.

The pins 30 are fitted into the press-fitting holes 12c and the pin insertion holes 26 which can be formed by simply drilling holes. This facilitates securing the positional accuracy of the press-fitting holes 12c and the pin insertion holes 26 and the machining accuracy of the pins 30, and applying an equal shearing force to the plurality of pins 30. In particular, the fact that the press-fitting holes 12c and the pin insertion holes 26 are cylindrical holes and the pins 30 are cylindrical members facilitates more reliably securing the positional accuracy of the press-fitting holes 12c and the pin insertion holes 26 and the machining accuracy of the pins 30. Consequently, the number of the pins 30 can be reduced to be as few as possible and the size of the pins 30 can be reduced to be as small as possible even in the case where large torque is applied, thereby achieving a size reduction of the rotation prevention mechanism 36. Thus, it is possible to reliably reduce gear noise emitted from the transmission case 11 while achieving a size reduction of the speed reduction mechanism 20.

With the pins 30 press-fitted into the press-fitting holes 12c, rattle between the press-fitting holes 12c and the pins 30 can be eliminated, thereby suppressing input of an offset load to the press-fitting holes 12c. This improves the durability of the transmission case 11.

The rotation prevention mechanism may also be configured such that the pins are provided to the ring gear flange 25 and the pin insertion holes are formed in the intermediate wall 12a. With the rotation prevention mechanism 36 configured such that the pins 30 are provided to the intermediate wall 12a and the pin insertion holes 26 are formed in the ring gear flange 25 as in the embodiment, however, the fitting holes 12b and the press-fitting holes 12c can be machined in the intermediate wall 12a at the same time during processing of the main housing 12. This improves the machining accuracy of the fitting holes 12b and the press-fitting holes 12c, thereby improving the centering accuracy of the ring gear 22 to advantageously reduce gear noise.

Rotation of the ring gear 22 may be prevented (the ring gear 22 may be fixed) by providing screw holes in either of the intermediate wall 12a and the ring gear flange 25 and fastening the intermediate wall 12a and the ring gear flange 25 to each other using bolts, instead of pin engagement. Because bolt loosening is apprehended in case of such bolt fastening, however, it is necessary to generate a large bolt fastening force by increasing the number of the bolts or increasing the length of the bolts. This may incur a rise in product cost and production cost. In addition, the size of the drive device may be increased to secure a space for arrangement of the bolts. For the reasons given above, it is impractical to prevent rotation of (fix) the ring gear 22 through bolt fastening.

In the rotation prevention mechanism 36 according to the embodiment, knock holes into which knock pins for positioning between the main housing 12 and the extension housing 13 are to be struck can be machined in the main housing 12 at the same time as the fitting holes 12b and the press-fitting holes 12c. Therefore, the main housing 12 and the extension housing 13 can be positioned accurately with respect to each other, thereby increasing the positional accuracy of the speed reduction mechanism 20. This is because the ring gear 22 is centered utilizing the fitting holes 12b formed in the intermediate wall 12a of the main housing 12, and the bearing 29 which supports the planetary carrier 24 of the speed reduction mechanism 20 is fixed to the extension housing 13. The thus secured positional accuracy of the entire speed reduction mechanism 20 advantageously reduces gear noise and favorably affects the durability of the gears. In addition, the fitting holes 12b, the press-fitting holes 12c, and the knock holes can be machined at the same time, and the pins 30 and the knock pins can be struck at the same time, improving productivity.

The thus configured rotation prevention mechanism 36 is disposed on the outer side with respect to the bearing 54 which supports the rotor shaft 16 of the motor generator MG (that is, the bearing 54 is disposed on the radially inner side with respect to the rotation prevention mechanism 36) and on the radially inner side with respect to a coil end 53a. Therefore, the rotation prevention mechanism 36 can be disposed utilizing a vacant space provided on the radially inner side with respect to the coil end 53a of the motor generator MG. This eliminates the need to additionally provide a space for arrangement of the rotation prevention mechanism 36 configured to fix the ring gear 22 to the transmission case 11 via the ring gear flange 25. Thus, adopting the fixing structure for the ring gear 22 according to the embodiment does not increase the axial dimension of the drive device 10.

In addition, the rotation prevention mechanism 36 is disposed so as to overlap the coil end 53a, the bearing 54, and the centering mechanism 35 in the axial direction. This makes it possible to reduce the axial dimension of the drive device 10, that is, to achieve a size reduction of the drive device 10 in the axial direction.

In the rotation prevention mechanism 36, further, the press-fitting holes 12c for press-fitting of the pins 30 and the pin insertion holes 26 for insertion of the pins 30 are stepped holes. Specifically, each of the press-fitting holes 12c and the pin insertion holes 26 includes a large-diameter hole portion for press-fitting or insertion of the pins 30, and a small-diameter hole portion that is smaller in diameter than the large-diameter hole portion. This makes it possible to prevent the pins 30 from slipping out of the press-fitting holes 12c and the pin insertion holes 26 even if the pins 30 press-fitted into the press-fitting holes 12c are disengaged from the intermediate wall 12a. Thus, the ring gear 22 can be prevented from rotating (fixed) reliably by the pins 30 even in the case where the pins 30 are disengaged from the intermediate wall 12a. The press-fitting holes and the pin insertion holes may be bottomed holes instead of stepped holes.

Subsequently, operation of the drive device 10 described above will be described briefly. When the motor generator MG is driven as an electric motor, power (torque) of the motor generator MG is transferred to the sun gear 21 via the rotor shaft 16. Then, in the speed reduction mechanism 20, in which the ring gear 22 is fixed, the planetary pinion gears 23 which mesh with the sun gear 21 revolve while rotating about their respective axes. This allows rotation of the sun gear 21 to be transferred to the planetary carrier 24 with the speed of the rotation reduced to rotate the output shaft 15 which meshes with the planetary carrier 24. In this way, in the drive device 10, rotation of the motor generator MG is transferred to the output shaft 15 with the speed of the rotation reduced by the speed reduction mechanism 20.

During rotation of the planetary pinion gears 23, the ring gear 22 receives a radially outward force from the planetary pinion gears 23 to be deformed. In the drive device 10 according to the embodiment, however, the outer periphery of the ring gear 22 and the transmission case 11 do not contact each other, and therefore it is less likely that vibration generated by deformation of the ring gear 22 itself is transferred to the transmission case 11. In addition, it is also less likely that vibration due to meshing between the planetary pinion gears 23 and the ring gear 22 is transferred to the transmission case 11. Therefore, gear noise emitted from the transmission case 11 can be reduced.

With the ring gear 22 centered accurately as described above, tooth contact between the planetary pinion gears 23 and the ring gear 22 is significantly good. This makes it possible to improve the durability of the gears in the speed reduction mechanism 20, and to reduce gear noise itself. Thus, gear noise emitted from the transmission case 11 can be further reduced.

Figure 4:
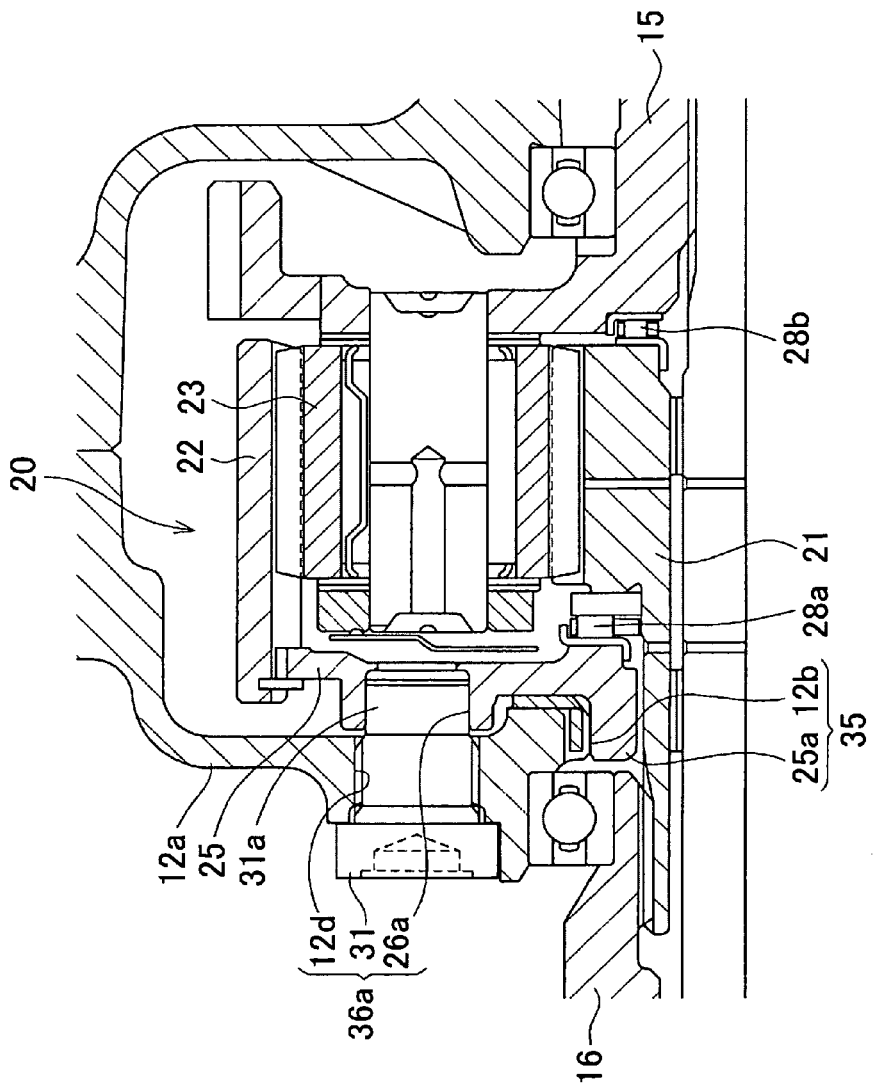
FIG. 4 is a sectional view showing a schematic configuration of a rotation prevention mechanism according to a first modification.
Figure 5:
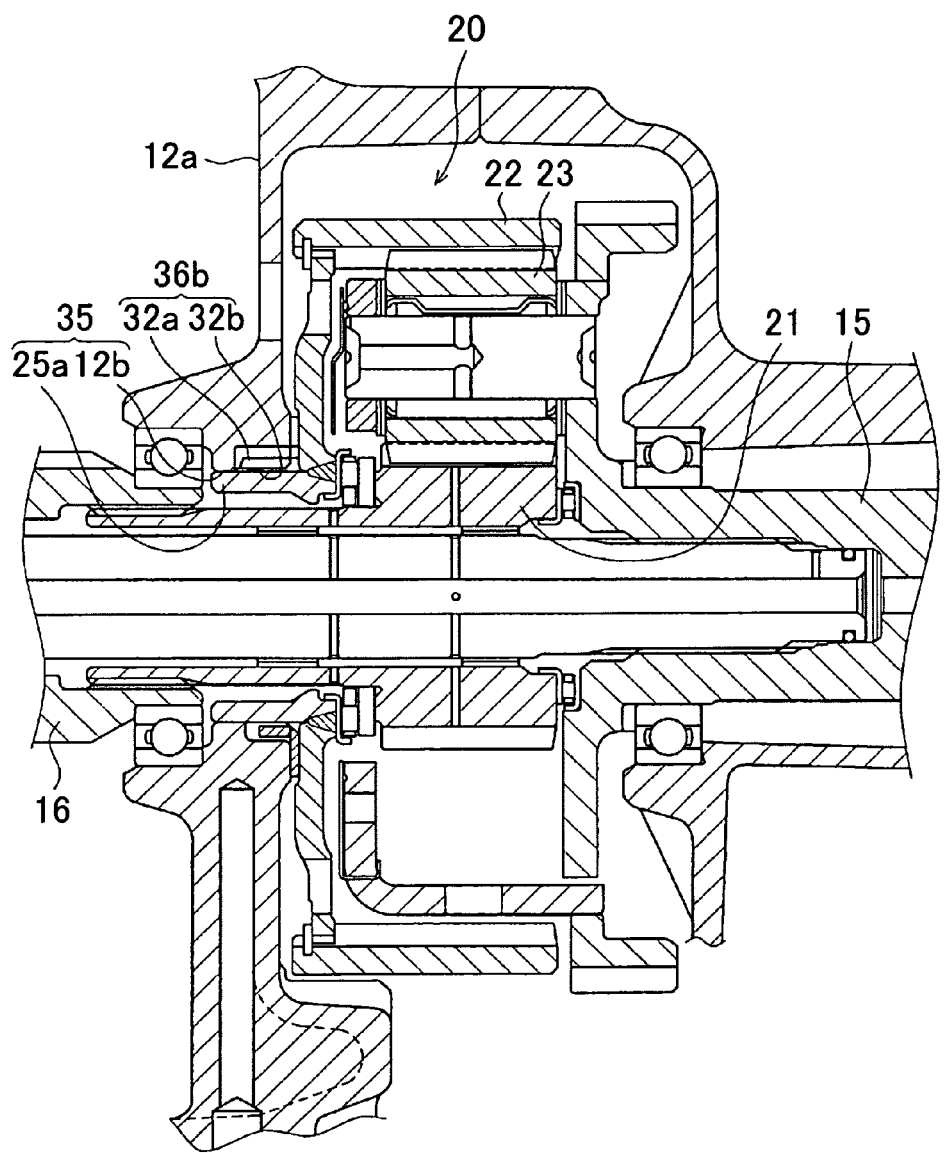
FIG. 5 is a sectional view showing a schematic configuration of a rotation prevention mechanism according to a second modification.
Figure 6:
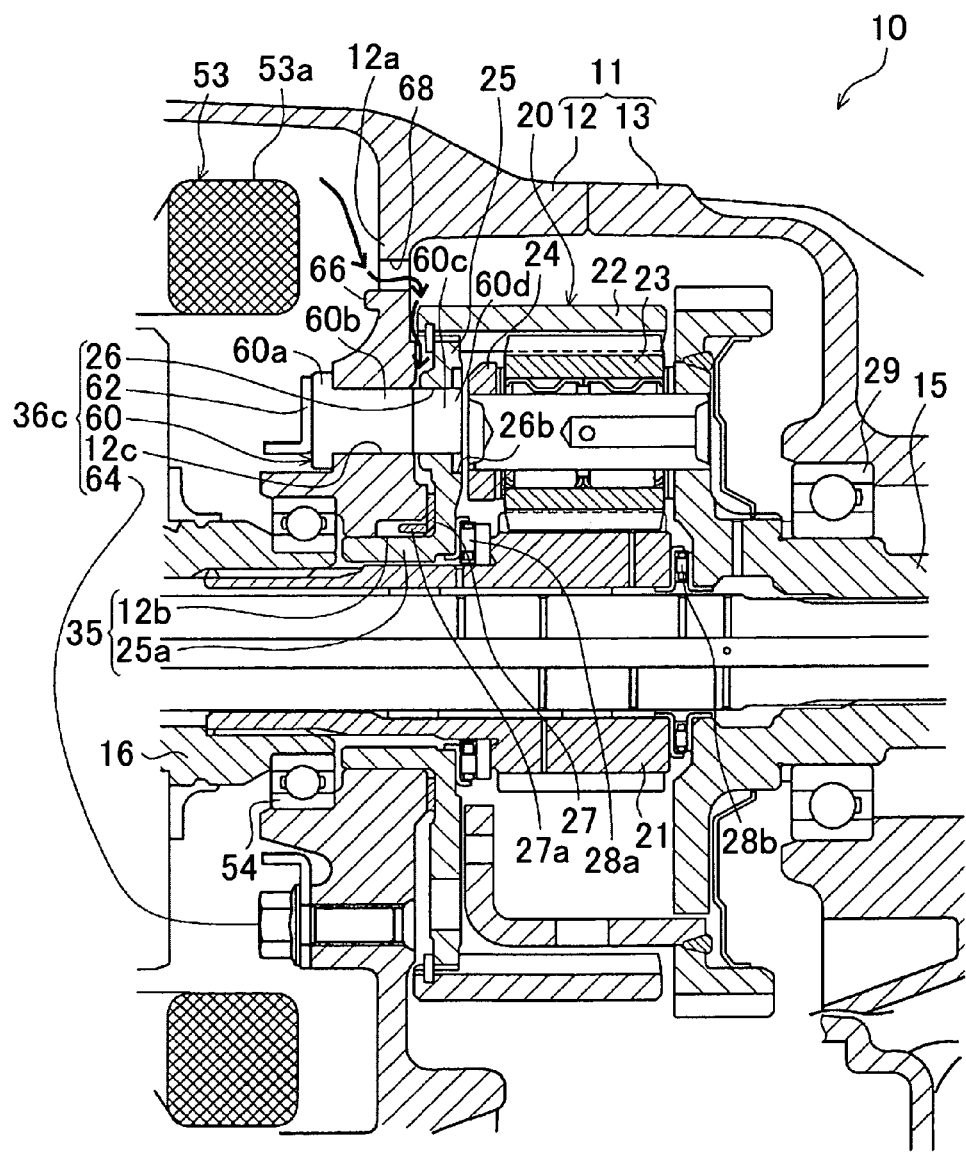
FIG. 6 is a sectional view showing a schematic configuration of a rotation prevention mechanism according to a third modification.
Figure 7:
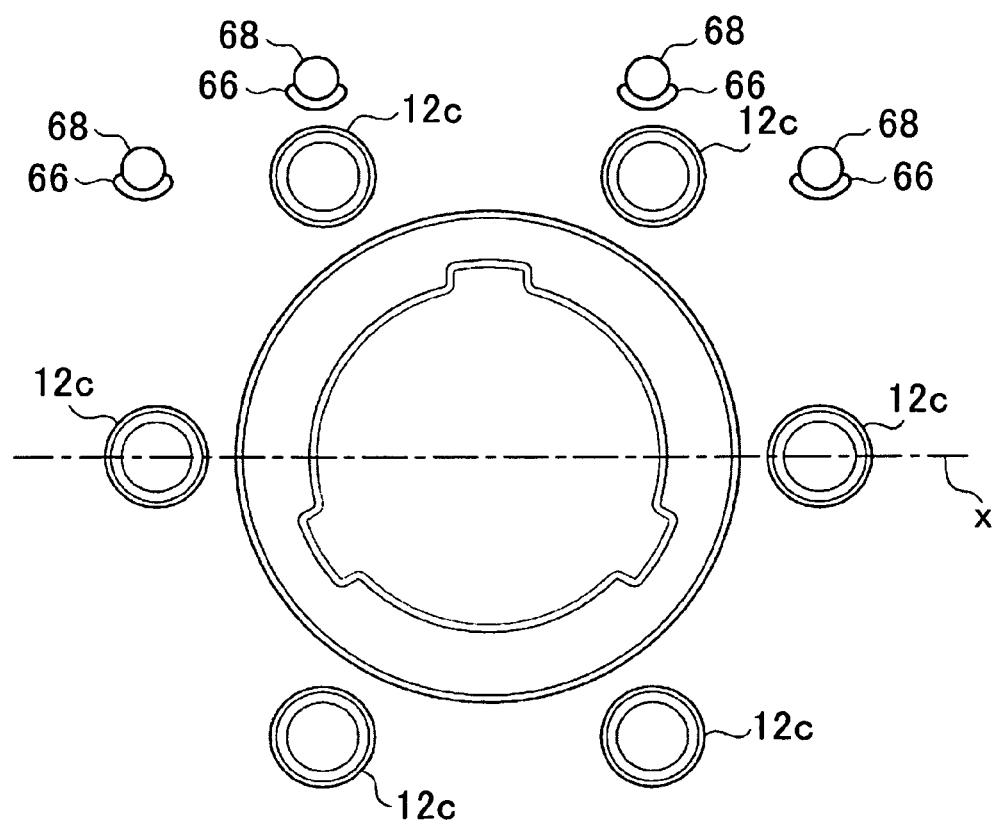
FIG. 7 shows the arrangement of press-fitting holes, lubrication gutters, and oil bores formed in an intermediate wall.
Figure 8:
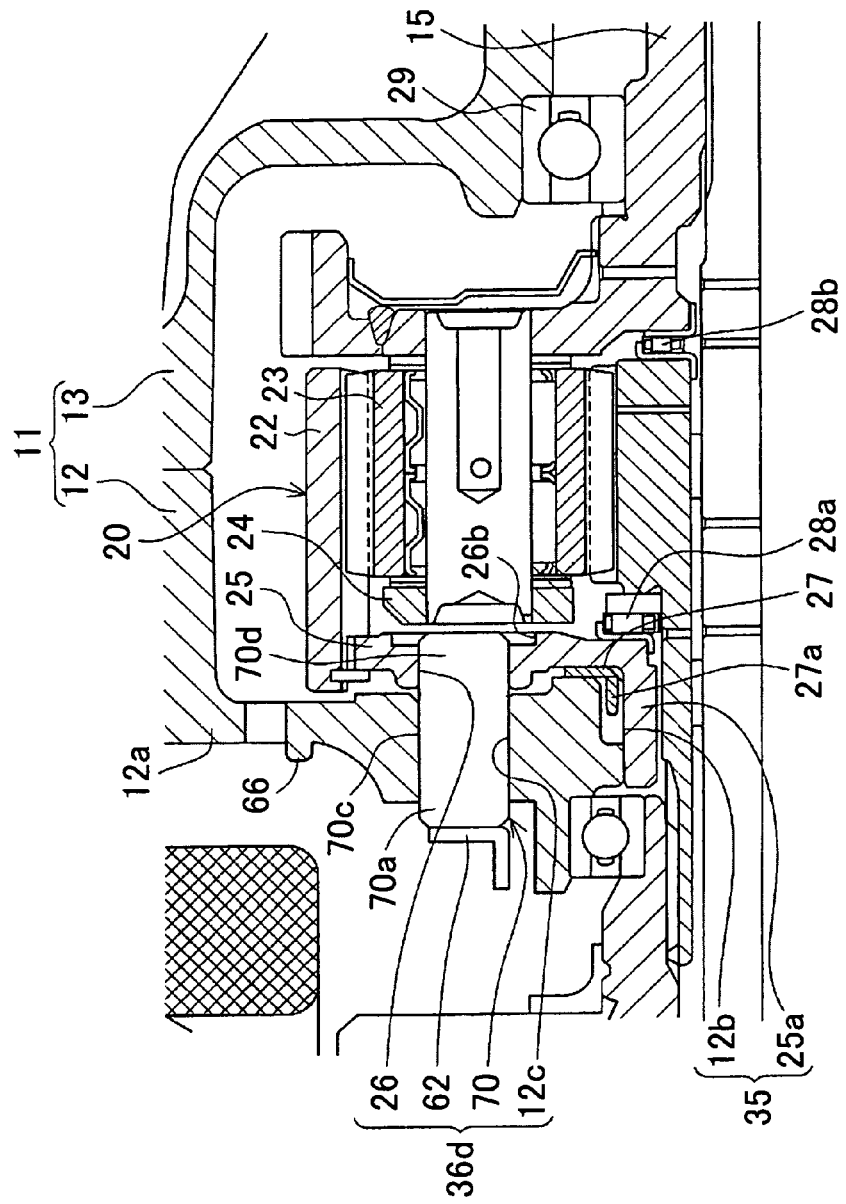
FIG. 8 is a sectional view showing a schematic configuration of a rotation prevention mechanism according to a fourth modification.
Figure 9:
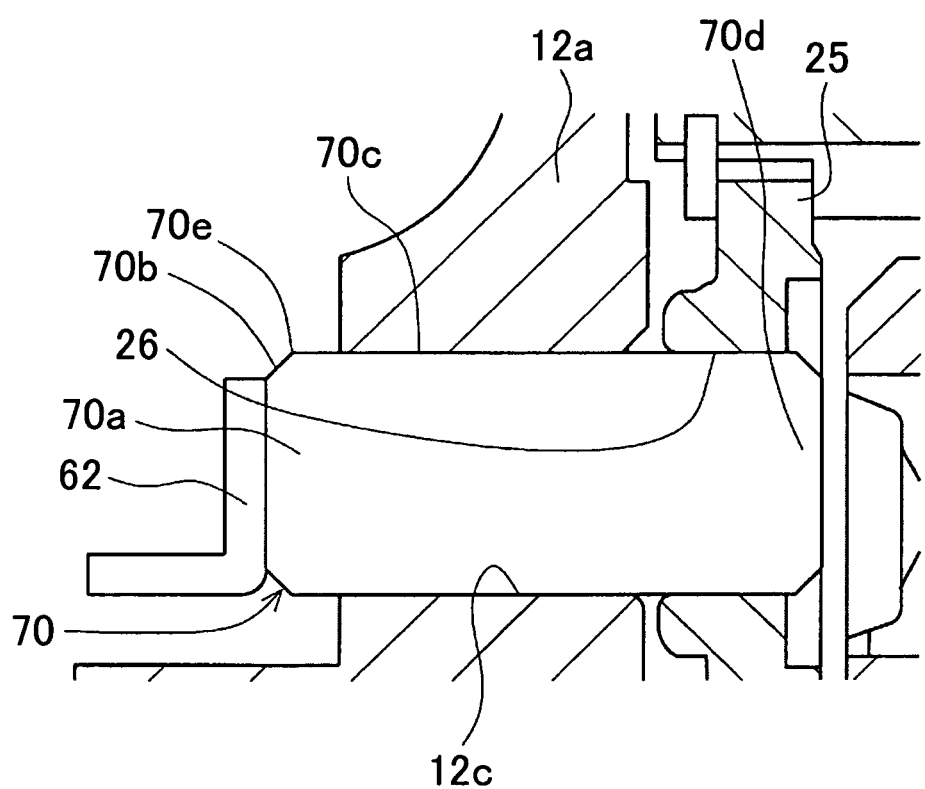
FIG. 9 is an enlarged view of the area around a pin in the fourth modification.

Modifications of the rotation prevention mechanism will be described with reference to FIGS. 4 to 15. FIG. 4 shows a schematic configuration of a first modification. FIG. 5 shows a schematic configuration of a second modification. FIG. 6 shows a schematic configuration of a third modification. FIG. 7 shows the arrangement of press-fitting holes, lubrication gutters, and oil bores formed in an intermediate wall in the third modification. FIG. 8 shows a schematic configuration of a fourth modification. FIG. 9 is an enlarged view showing the area around a pin in the fourth modification. FIGS. 10 to 15 illustrate the effect of one end portion of the pin projecting from an intermediate wall in the fourth modification.

In the first modification, the ring gear 22 is fixed using anchor bolts. In the second modification, the ring gear 22 is fixed through spline engagement. In the third modification, the ring gear 22 is fixed using pins including a flange portion. In the fourth modification, the ring gear 22 is fixed using cylindrical pins.

First, the first modification will be described. In the first modification, as shown in FIG. 4, an anchor bolt 31 is used instead of the pin 30 in a rotation prevention mechanism 36a. The anchor bolt 31 is screwed into a threaded bore 12d formed in the intermediate wall 12a to penetrate through the intermediate wall 12a, instead of the press-fitting hole 12c, to be fastened to the threaded bore 12d. An end portion 31a of the anchor bolt 31 projects from the intermediate wall 12a, and the end portion 31a is inserted into a pin insertion hole 26a formed in the ring gear flange 25 instead of the pin insertion hole 26. This allows the ring gear 22 to be fixed to the intermediate wall 12a via the ring gear flange 25. That is, in the first modification, the rotation prevention mechanism 36a is formed from the anchor bolt 31, the threaded bore 12d, and the pin insertion hole 26a. The anchor bolt 31 fixes (prevents rotation of) the ring gear flange 25 and the ring gear 22 with respect to the intermediate wall 12a with the ring gear flange 25 and the ring gear 22 relatively movable in the axial direction with respect to the intermediate wall 12a.

With the anchor bolt 31 used in the rotation prevention mechanism 36a, it is less likely that the anchor bolt 31 slips out of the intermediate wall 12a (or rattles) compared to the pin 30. As a result, the ring gear 22 can be firmly fixed in position over an extended period. This does not degrade tooth contact between the ring gear 22 and the planetary pinion gears 23 over an extended period, thereby improving the durability of the gears in the speed reduction mechanism 20 and reducing gear noise.

Next, a second modification will be described. In the second modification, as shown in FIG. 5, spline engagement is utilized instead of engagement between the pins 30 and the pin insertion holes 26 in a rotation prevention mechanism 36b. Specifically, male splines 32a formed on the outer periphery of the boss portion 25a of the ring gear flange 25 and female splines 32b formed on the inner periphery of the fitting hole 12b of the intermediate wall 12a are spline-engaged with each other. The spline engagement between the male splines 32a and the female splines 32b allows the ring gear 22 to be fixed to the intermediate wall 12a via the ring gear flange 25. That is, in the second modification, the rotation prevention mechanism 36b is formed from the male splines 32a and the female splines 32b.

The work of fixing a plurality of pins 30 or anchor bolts 31 to the intermediate wall 12a can be dispensed with by utilizing spline engagement between the male splines 32a and the female splines 32b as the rotation prevention mechanism 36b. Therefore, the work of assembling the drive device 10 can be simplified, thereby improving the productivity of the drive device 10 and contributing to a reduction in product cost.

Next, a third modification will be described. In the third modification, as shown in FIG. 6, a pin 60 (an example of the "rotation prevention member" and the "bar-like member" according to the present invention) including a flange portion 60a is used instead of the pin 30 in a rotation prevention mechanism 36c. The pin 60 includes a flange portion 60a, a press-fitted portion 60b, and an end portion 60c arranged in this order from the motor generator MG side. That is, in the pin 60, the flange portion 60a is provided at an end portion opposite to the side on which the ring gear flange 25 is disposed with respect to the intermediate wall 12a. The diameter of the flange portion 60a is formed to be larger than the diameter of the press-fitted portion 60b. That is, the diameter of the flange portion 60a is formed to be larger than the diameter of the press-fitting hole 12c which penetrates through the intermediate wall 12a, and the diameter of the end portion 60c is formed to be smaller than the diameter of the press-fitted portion 60b. The pin 60 is press-fitted into the press-fitting hole 12c of the intermediate wall 12a to be fixed. The end portion 60c of the pin 60 projects from the intermediate wall 12a, and the end portion 60c is inserted into the pin insertion hole 26 of the ring gear flange 25. An annular plate 62 for slipping prevention is provided on the motor generator MG side of the pin 60. The plate 62 is fastened to be fixed to the intermediate wall 12a by a bolt 64.

The diameter of the pin insertion hole 26 is made slightly larger than the diameter of the end portion 60c of the pin 60 to improve the ease of attachment of the speed reduction mechanism 20 to the intermediate wall 12a. Insertion of the end portion 60c of the pin 60 into the pin insertion hole 26 fixes (prevents rotation of) the ring gear 22 to the intermediate wall 12a via the ring gear flange 25. That is, in the third modification, the rotation prevention mechanism 36c is formed from the pin 60, the press-fitting hole 12c, the pin insertion hole 26, the plate 62, and the bolt 64. The pin 60 fixes (prevents rotation of) the ring gear flange 25 and the ring gear 22 with respect to the intermediate wall 12a with the ring gear flange 25 and the ring gear 22 relatively movable in the axial direction with respect to the intermediate wall 12a.

Since the pin 60 includes the flange portion 60a provided on the motor generator MG side with respect to the intermediate wall 12a, the pin 60 is not disengaged from the intermediate wall 12a to slip off to the speed reduction mechanism 20 side, to which such slipping tends to occur. Therefore, with the pin 60 used in the rotation prevention mechanism 36c, it is less likely that the pin 60 slips out of the intermediate wall 12a compared to the pin 30. Since the annular plate 62 for slipping prevention is provided on the motor generator MG side of the pin 60, the pin 60 is also not disengaged from the intermediate wall 12a to slip off to the motor generator MG side.

The pin 60 can be stably press-fitted into the press-fitting hole 12c of the intermediate wall 12a by pushing the flange portion 60a when press-fitting the pin 60 into the press-fitting hole 12c of the intermediate wall 12a. With the pin 60 including the flange portion 60a, in addition, the pin 60 is directional. Because it is easier to secure the machining accuracy in drilling of the press-fitting hole 12c than to secure the machining accuracy in forming bolt groove threads for such as the threaded bore 12d according to the first modification, productivity is improved.

In the pin 60, the diameter of the end portion 60c which is inserted into the pin insertion hole 26 of the ring gear flange 25 to be fitted is made smaller than the diameter of the press-fitted portion 60b which is press-fitted into the press-fitting hole 12c of the intermediate wall 12a. This allows the pin 60 to be press-fitted into the press-fitting hole 12c of the intermediate wall 12a by first inserting the end portion 60c of the pin 60 into the press-fitting hole 12c to correct the direction of the pin 60 such that the axial direction of the pin 60 matches the direction of the center axis of the press-fitting hole 12c, and thereafter press-fitting the press-fitted portion 60b of the pin 60 into the press-fitting hole 12c of the intermediate wall 12a. Because the pin 60 does not fall when the pin 60 is press-fitted into the press-fitting hole 12c, the positional accuracy of the pin 60 is improved. With the positional accuracy of the pin 60 improved, the ring gear 22 can be fixed at a predetermined position. As a result, tooth contact between the ring gear 22 and the planetary pinion gears 23 can be improved in combination with the accurate centering of the ring gear 22 achieved by the centering mechanism 35. Thus, the durability of the gears in the speed reduction mechanism 20 is improved, and gear noise is reduced.

As shown in FIG. 6, the intermediate wall 12a additionally includes a lubrication gutter 66 and an oil bore 68 provided on the radially outer side with respect to the rotation prevention mechanism 36c. The oil bore 68 penetrates through the intermediate wall 12a in the axial direction. This allows cooling oil flowing from the coil 53 of the motor generator MG to be received by the lubrication gutter 66 to be guided to flow into the oil bore 68 and be circulated to the speed reduction mechanism 20 side via the oil bore 68 to flow to the pin 60 so that the cooling oil can be utilized again as lubricating oil for the pin 60 as indicated by the arrows in FIG. 6. With the cooling oil for the oil 53 of the motor generator MG thus utilized again for lubrication of the pin 60, there is no more fear that the pin 60 may be rubbed against the ring gear flange 25 to be worn.

As shown in FIG. 7, four lubrication gutters 66 and four oil bores 68 are disposed at positions at least above (above in FIG. 7) a center axis X of the intermediate wall 12a when the drive device 10 is mounted on a vehicle. Two lubrication gutters 66 and two oil bores 68 are disposed at positions above two press-fitting holes 12c, of the six press-fitting holes 12c, positioned at the highest (at the highest in FIG. 7). The number of the lubrication gutters 66 and the oil bores 68 is not specifically limited, and may be changed appropriately. With the lubrication gutters 66 and the oil bores 68 disposed in this way, the cooling oil flowing out of the oil bores 68 reliably flows to all the six pins 60 press-fitted into the six press-fitting holes 12c. FIG. 7 shows the arrangement of the press-fitting holes 12c, the lubrication gutters 66, and the oil bores 68 formed in the intermediate wall 12a. The thus configured lubrication gutters 66 and oil bores 68 can also be adopted appropriately in the embodiment shown in FIG. 1 described above and the first modification described above.

As shown in FIG. 6, the pin insertion hole 26 of the ring gear flange 25 includes a large-diameter hole portion 26b provided on the planetary carrier 24 side. When the pin 60 is press-fitted into the press-fitting hole 12c of the intermediate wall 12a to be fixed, a forefront end portion 60d of the end portion 60c of the pin 60 projects in the large-diameter hole portion 26b. This allows surface contact between the pin insertion hole 26 and the pin 60 so that the pin insertion hole 26 and the pin 60 are rubbed against each other when torque is input to the speed reduction mechanism 20, preventing stepped wear of the pin insertion hole 26.

The axial length of the boss portion 25a of the ring gear flange 25 is larger than that in the embodiment shown in FIG. 1 described above. More specifically, the boss portion 25a is longer in the axial direction than the end portion 60c (a portion that projects to the side on which the ring gear flange 25 is disposed with respect to the intermediate wall 12a) of the pin 60. This facilitates assembling the ring gear flange 25 to the intermediate wall 12a with the pin 60 press-fitted into the press-fitting hole 12c while press-fitting the boss portion 25a of the ring gear flange 25 into the fitting hole 12b of the intermediate wall 12a, thereby improving the ease of assembly of the ring gear flange 25 to the intermediate wall 12a. This also makes it possible to suppress inclination of the ring gear flange 25, thereby further improving the centering accuracy of the ring gear 22.

The pins 60 are fitted into the press-fitting holes 12c and the pin insertion holes 26 which can be formed by simply drilling holes. This facilitates securing the positional accuracy of the press-fitting holes 12c and the pin insertion holes 26 and the machining accuracy of the pins 60, and applying an equal shearing force to the plurality of pins 60. Consequently, the number of the pins 60 can be reduced to be as few as possible and the size of the pins 60 can be reduced to be as small as possible even in the case where large torque is applied, thereby achieving a size reduction of the rotation prevention mechanism 36c. Thus, it is possible to reliably reduce gear noise emitted from the transmission case 11 while achieving a size reduction of the speed reduction mechanism 20.

With the pins 60 press-fitted into the press-fitting holes 12c, rattle between the press-fitting holes 12c and the pins 60 can be eliminated, thereby suppressing input of an offset load to the press-fitting holes 12c. This improves the durability of the transmission case 11.

Next, a fourth modification will be described. In the fourth modification, as shown in FIG. 8, a cylindrical pin 70 (an example of the "rotation prevention member" and the "bar-like member" according to the present invention) is used in a rotation prevention mechanism 36d. As shown in FIG. 9, the pin 70 includes one end portion 70a (an end portion opposite to the side on which the ring gear flange 25 is disposed with respect to the intermediate wall 12a) provided on one side in the axial direction, and the other end portion 70d (an end portion on the side on which the ring gear flange 25 is disposed with respect to the intermediate wall 12a) provided on the other side in the axial direction. The pin 70 also includes a chamfered portion 70b provided at the one end portion 70a, and further includes a press-fitted portion 70c.

The pin 70 is formed to be longer in the axial direction than the fitting hole 12c which penetrates through the intermediate wall 12a, and fixed to the intermediate wall 12a with a part of the press-fitted portion 70c press-fitted into the press-fitting hole 12c. The other end portion 70d of the pin 70 projects from the intermediate wall 12a, and the other end portion 70d is inserted (fitted with play) into the pin insertion hole 26 of the ring gear flange 25. The pin 70 thus fixes (prevents rotation of) the ring gear flange 25 and the ring gear 22a with respect to the intermediate wall 12a with the ring gear flange 25 and the ring gear 22a relatively movable in the axial direction with respect to the intermediate wall 12a.

In particular, the one end portion 70a of the pin 70 projects from the intermediate wall 12a. More specifically, as shown in FIG. 9, a boundary portion 70e between the chamfered portion 70b and the press-fitted portion 70c at the one end portion 70a projects from the intermediate wall 12a to the side on which the motor generator MG is disposed.

The effect of the one end portion 70a of the pin 70 projecting from the intermediate wall 12a will be described with reference to FIGS. 10 to 15. In FIGS. 10 to 15, for convenience of description, the intermediate wall 12a and the pin 70 are shown schematically, and the ring gear flange 25 is not shown.

Figure 10:
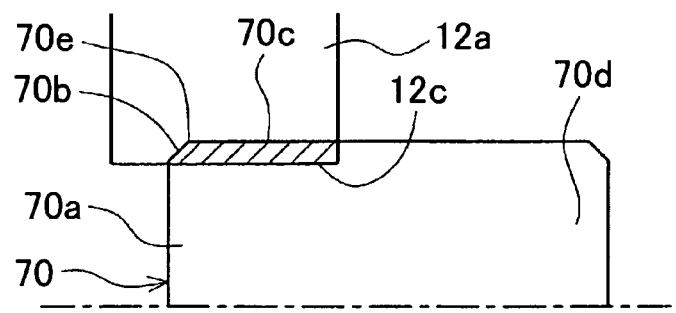
FIG. 10 shows a case where one end portion of the pin does not project from the intermediate wall.
Figure 11:
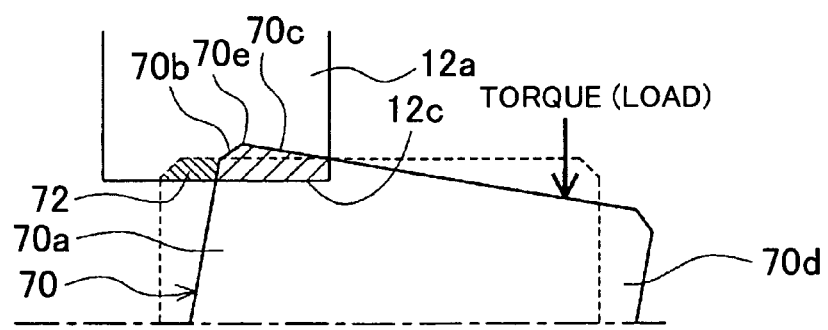
FIG. 11 shows a state in which torque is applied to the other end portion of the pin in the case where the one end portion of the pin does not project from the intermediate wall.
Figure 12:
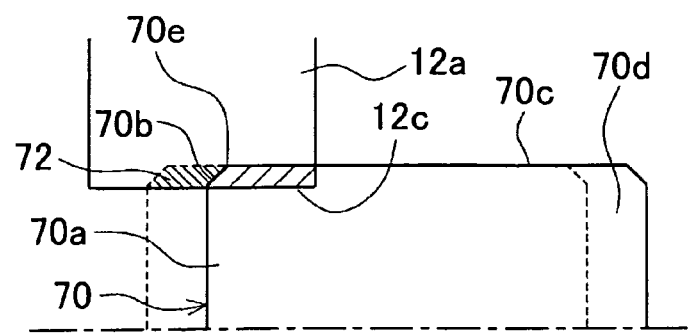
FIG. 12 shows a state in which torque is not applied to the other end portion of the pin any more in the case where the one end portion of the pin does not project from the intermediate wall.

First, a case where the one end portion 70a of the pin 70 does not project from the intermediate wall 12a as shown in FIG. 10 is assumed. When the other end portion 70d receives torque (a load) as shown in FIG. 11, the pin 70 is inclined to be moved in the axial direction, thereby forming a slipped press-fitted portion 72. When the other end portion 70d does not receive torque any more, the pin 70 is pushed out by an amount for the slipped press-fitted portion 72 as shown in FIG. 12. When the other end portion 70d repeatedly receives torque thereafter, the pin 70 may slip out of the press-fitting hole 12c.

Figure 13:
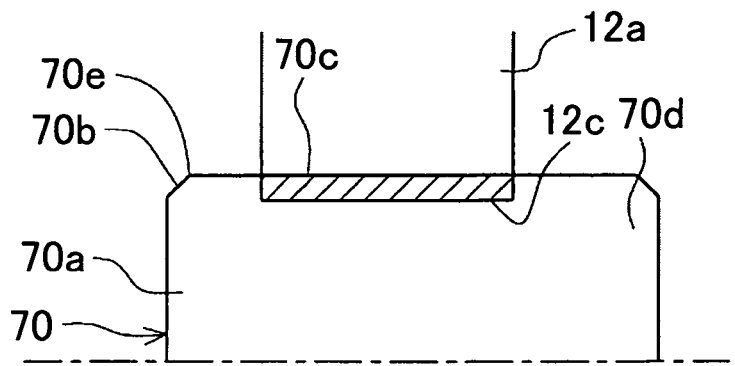
FIG. 13 is a schematic view showing a state in which one end portion of the pin projects from the intermediate wall in the fourth modification.
Figure 14:
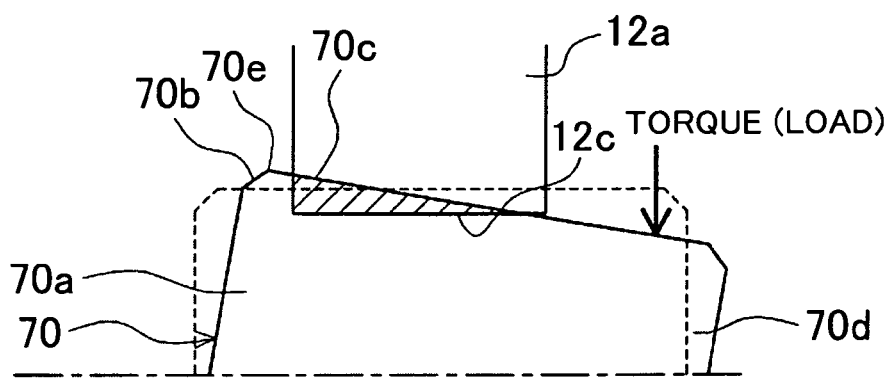
FIG. 14 shows a state in which torque is applied to the other end portion of the pin in the fourth modification.
Figure 15:
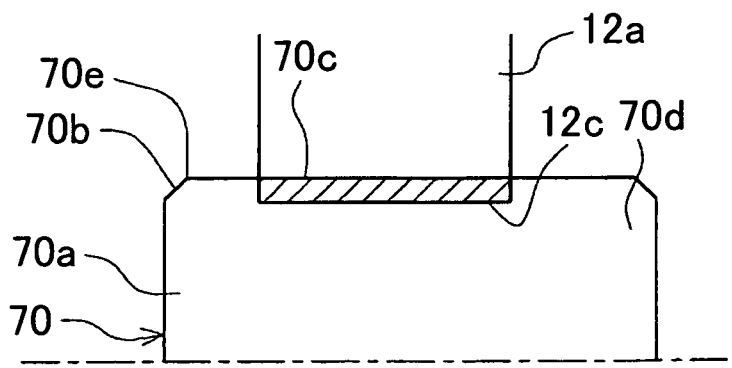
FIG. 15 shows a state in which torque is not applied to the other end portion of the pin any more in the fourth modification.

In the fourth modification, in contrast, as shown in FIG. 13 (more specifically, as shown in FIGS. 8 and 9 described above), the one end portion 70a of the pin 70 projects from the intermediate wall 12a. When the other end portion 70d receives torque as shown in FIG. 14, no slipped press-fitted portion 72 is formed even if the pin 70 is inclined. This prevents the pin 70 from being pushed out when the other end portion 70d does not receive torque any more as shown in FIG. 15. Therefore, the pin 70 does not slip out of the press-fitting hole 12c even if the other end portion 70d repeatedly receives torque thereafter.

According to the fourth modification, the one end portion 70a of the pin 70 projects from the intermediate wall 12a. Thus, the effect that the pin 70 does not slip out of the press-fitting hole 12c even if the other end portion 70d of the pin 70 repeatedly receives torque can be further obtained.

The pins 70 are fitted into the press-fitting holes 12c and the pin insertion holes 26 which can be formed by simply drilling holes. This facilitates securing the positional accuracy of the press-fitting holes 12c and the pin insertion holes 26 and the machining accuracy of the pins 70, applying an equal shearing force to the plurality of pins 70. Consequently, the number of the pins 70 can be reduced to be as few as possible and the size of the pins 70 can be reduced to be as small as possible even in the case where large torque is applied, thereby achieving a size reduction of the rotation prevention mechanism 36d. Thus, it is possible to reliably reduce gear noise emitted from the transmission case 11 while achieving a size reduction of the speed reduction mechanism 20.

With the drive device 10 according to the embodiment described in detail above, the ring gear 22 is fixed to the intermediate wall 12a via the ring gear flange 25 which is positioned with respect to and fixed to the intermediate wall 12a by the centering mechanism 35 and the rotation prevention mechanism 36. This saves physical contact between the outer periphery of the ring gear 22 and the transmission case 11, thereby making it less likely that vibration due meshing between the gears and vibration caused by deformation of the ring gear 22 itself due to a compelling force is transferred to the outer periphery of the transmission case 11. In addition, vibration of the ring gear 22 due to other factors is transferred to the outer periphery of the transmission case 11 via the intermediate wall 12a. As a result, gear noise emitted from the transmission case 11 can be reliably reduced.

In the drive device 10, the ring gear 22 can be centered by the centering mechanism 35 which uses the spigot joint between the boss portion 25a of the ring gear flange 25 and the intermediate wall 12a. With the ring gear 22 fixed via the ring gear flange 25, in addition, the ring gear 22 can also be centered through meshing between the ring gear 22 and the planetary pinion gears 23. The ring gear 22 can thus be centered accurately.

In the drive device 10, further, the rotation prevention mechanism 36 is disposed on the outer peripheral side with respect to the centering mechanism 35, thereby allowing the rotation prevention mechanism 36 to be disposed relatively on the outer peripheral side in the ring gear flange 25. Therefore, the load acting on the rotation prevention mechanism 36 (mainly the pins 30) can be reduced, thereby allowing the ring gear 22 to be firmly fixed in position. The firm fixation of the ring gear 22 and the accurate centering of the ring gear 22 described above can improve tooth contact between the ring gear 22 and the planetary pinion gears 23. This makes it possible to reduce gear noise without reducing the durability of the gears. Thus, gear noise emitted from the transmission case 11 can be further reduced. In addition, the centering mechanism 35 with reduced rattle is disposed on the inner peripheral side, and the rotation prevention mechanism 36 which may cause greater rattle than that caused by the centering mechanism 35 is disposed on the outer peripheral side. This prevents galling due to a difference in thermal expansion coefficient between the intermediate wall 12a and the ring gear flange 25.

The pins 30, 60, 70 are fitted into the press-fitting holes 12c and the pin insertion holes 26 which can be formed by simply drilling holes. In particular, the fact that the press-fitting holes 12c and the pin insertion holes 26 are cylindrical holes facilitates more reliably securing the positional accuracy of the press-fitting holes 12c and the pin insertion holes 26 and the machining accuracy of the pins 30, 60, 70. Consequently, the number of the pins 30, 60, 70 can be reduced to be as few as possible and the size of the pins 30, 60, 70 can be reduced to be as small as possible even in the case where large torque is applied, thereby achieving a size reduction of the rotation prevention mechanism 36, 36c, 36d. Thus, it is possible to reliably reduce gear noise emitted from the transmission case 11 while achieving a size reduction of the speed reduction mechanism 20.

The embodiment described above is merely illustrative, and does not limit the present invention in any way. It is a matter of course that various improvements and modifications may be made without departing from the scope and spirit of the present invention. For example, although the intermediate wall 12a is provided with protruding portions using the pins 30, the anchor bolts 31, or the like in the embodiment described above, protruding portions may be shaped integrally when shaping the main housing 12. It is a matter of course that the thus integrally shaped protruding portions may be provided on the ring gear flange 25 rather than on the main housing 12.

In addition, although the present invention is applied to a longitudinally-mounted drive device to be mounted on a front-engine rear-drive (FR) vehicle in the embodiment described above, the present invention may also be applied to a transversely-mounted drive device to be mounted on a front-engine front-drive (FF) vehicle.

The invention claimed is:

1. A planetary gear unit housed inside a case and comprising a sun gear, a ring gear disposed coaxially with the sun gear, a planetary pinion gear that meshes with the sun gear and the ring gear, and a planetary carrier that holds the planetary pinion gear, the ring gear being fixed with respect to the case, wherein:
the planetary gear unit includes a ring gear flange disposed on an inner peripheral side with respect to the ring gear;
the ring gear is fixed to a case wall via the ring gear flange, the case wall being formed in the case to extend radially inward, and the ring gear flange being prevented from rotating with respect to the case wall by a rotation prevention mechanism; and
the rotation prevention mechanism includes a plurality of case holes formed on the same circle in the case wall, flange holes provided in the ring gear flange at positions corresponding to the case holes, and rotation prevention members fitted into the case holes and the flange holes to prevent rotation of the ring gear flange with respect to the case wall with the ring gear flange relatively movable in an axial direction with respect to the case wall.

2. The planetary gear unit according to claim 1, wherein the rotation prevention members are press-fitted into the case holes, and loosely fitted into the flange holes.

3. The planetary gear unit according to claim 2, wherein:
the case holes are holes that penetrate through the case wall; and
the rotation prevention members are longer than the case holes in the axial direction, and end portions of the rotation prevention members on a side opposite to a side on which the ring gear flange is disposed with respect to the case wall project from the case wall.

4. The planetary gear unit according to claim 3, wherein the rotation prevention members include a flange portion provided at the end portions of the rotation prevention members on the side opposite to the side on which the ring gear flange is disposed with respect to the case wall, the flange portion being larger in diameter than the case holes.

5. The planetary gear unit according to claim 4, wherein:
the ring gear flange is positioned with respect to the case wall by a centering mechanism;
the centering mechanism uses fitting between a boss portion of the ring gear flange and the case wall; and
the rotation prevention mechanism is disposed on an outer peripheral side with respect to the centering mechanism.

6. The planetary gear unit according to claim 5, wherein the boss portion is longer than portions of the rotation prevention members that project toward the side on which the ring gear flange is disposed with respect to the case wall in the axial direction.

7. The planetary gear unit according to claim 6, wherein an amount of relative movement of the ring gear flange with respect to the case wall in the axial direction is restricted by the case via a bearing and the sun gear.

8. The planetary gear unit according to claim 7, wherein the rotation prevention members are bar-like members.

9. The planetary gear unit according to claim 8, wherein:
the case holes and the flange holes are cylindrical holes; and
the bar-like members are cylindrical members.

10. The planetary gear unit according to claim 2, wherein the rotation prevention members include a flange portion provided at the end portions of the rotation prevention members on the side opposite to the side on which the ring gear flange is disposed with respect to the case wall, the flange portion being larger in diameter than the case holes.

11. The planetary gear unit according to claim 2, wherein:
the ring gear flange is positioned with respect to the case wall by a centering mechanism;
the centering mechanism uses fitting between a boss portion of the ring gear flange and the case wall; and
the rotation prevention mechanism is disposed on an outer peripheral side with respect to the centering mechanism.

12. The planetary gear unit according to claim 11, wherein the boss portion is longer than portions of the rotation prevention members that project toward the side on which the ring gear flange is disposed with respect to the case wall in the axial direction.

13. The planetary gear unit according to claim 2, wherein an amount of relative movement of the ring gear flange with respect to the case wall in the axial direction is restricted by the case via a bearing and the sun gear.

14. The planetary gear unit according to claim 2, wherein the rotation prevention members are bar-like members.

15. The planetary gear unit according to claim 14, wherein:
the case holes and the flange holes are cylindrical holes; and
the bar-like members are cylindrical members.

16. The planetary gear unit according to claim 1, wherein:
the case holes are holes that penetrate through the case wall; and
the rotation prevention members are longer than the case holes in the axial direction, and end portions of the rotation prevention members on a side opposite to a side on which the ring gear flange is disposed with respect to the case wall project from the case wall.

17. The planetary gear unit according to claim 16, wherein the rotation prevention members include a flange portion provided at the end portions of the rotation prevention members on the side opposite to the side on which the ring gear flange is disposed with respect to the case wall, the flange portion being larger in diameter than the case holes.

18. The planetary gear unit according to claim 16, wherein:
the ring gear flange is positioned with respect to the case wall by a centering mechanism;
the centering mechanism uses fitting between a boss portion of the ring gear flange and the case wall; and
the rotation prevention mechanism is disposed on an outer peripheral side with respect to the centering mechanism.

19. The planetary gear unit according to claim 18, wherein the boss portion is longer than portions of the rotation prevention members that project toward the side on which the ring gear flange is disposed with respect to the case wall in the axial direction.

20. The planetary gear unit according to claim 16, wherein an amount of relative movement of the ring gear flange with respect to the case wall in the axial direction is restricted by the case via a bearing and the sun gear.

21. The planetary gear unit according to claim 16, wherein the rotation prevention members are bar-like members.

22. The planetary gear unit according to claim 21, wherein:
the case holes and the flange holes are cylindrical holes; and
the bar-like members are cylindrical members.

23. The planetary gear unit according to claim 1, wherein the rotation prevention members include a flange portion provided at the end portions of the rotation prevention members on the side opposite to the side on which the ring gear flange is disposed with respect to the case wall, the flange portion being larger in diameter than the case holes.

24. The planetary gear unit according to claim 23, wherein:
the ring gear flange is positioned with respect to the case wall by a centering mechanism;
the centering mechanism uses fitting between a boss portion of the ring gear flange and the case wall; and
the rotation prevention mechanism is disposed on an outer peripheral side with respect to the centering mechanism.

25. The planetary gear unit according to claim 24, wherein the boss portion is longer than portions of the rotation prevention members that project toward the side on which the ring gear flange is disposed with respect to the case wall in the axial direction.

26. The planetary gear unit according to claim 23, wherein an amount of relative movement of the ring gear flange with respect to the case wall in the axial direction is restricted by the case via a bearing and the sun gear.

27. The planetary gear unit according to claim 23, wherein the rotation prevention members are bar-like members.

28. The planetary gear unit according to claim 27, wherein:
the case holes and the flange holes are cylindrical holes; and
the bar-like members are cylindrical members.

29. The planetary gear unit according to claim 1, wherein:
the ring gear flange is positioned with respect to the case wall by a centering mechanism;
the centering mechanism uses fitting between a boss portion of the ring gear flange and the case wall; and
the rotation prevention mechanism is disposed on an outer peripheral side with respect to the centering mechanism.

30. The planetary gear unit according to claim 29, wherein the boss portion is longer than portions of the rotation prevention members that project toward the side on which the ring gear flange is disposed with respect to the case wall in the axial direction.

31. The planetary gear unit according to claim 29, wherein an amount of relative movement of the ring gear flange with respect to the case wall in the axial direction is restricted by the case via a bearing and the sun gear.

32. The planetary gear unit according to claim 29, wherein the rotation prevention members are bar-like members.

33. The planetary gear unit according to claim 32, wherein:
the case holes and the flange holes are cylindrical holes; and
the bar-like members are cylindrical members.

34. The planetary gear unit according to claim 1, wherein an amount of relative movement of the ring gear flange with respect to the case wall in the axial direction is restricted by the case via a bearing and the sun gear.

35. The planetary gear unit according to claim 34, wherein the rotation prevention members are bar-like members.

36. The planetary gear unit according to claim 35, wherein:
the case holes and the flange holes are cylindrical holes; and
the bar-like members are cylindrical members.

37. The planetary gear unit according to claim 1, wherein the rotation prevention members are bar-like members.

38. The planetary gear unit according to claim 37, wherein:
the case holes and the flange holes are cylindrical holes; and
the bar-like members are cylindrical members.

* * * * *